United States Patent
Rautanen et al.

(10) Patent No.: US 9,793,556 B2
(45) Date of Patent: Oct. 17, 2017

(54) GASKET FOR FUEL CELLS

(71) Applicant: Flexitallic Investments, Inc., Kingwood, TX (US)

(72) Inventors: Markus Rautanen, Espoo (FI); Olli Himanen, Espoo (FI); Jari Kiviaho, Espoo (FI); John Hoyes, Walsden Todmorden (GB)

(73) Assignee: Flexitallic Investments, Inc., Kingwood, TX (US)

( * ) Notice: Subject to any disclaimer, the term of this patent is extended or adjusted under 35 U.S.C. 154(b) by 250 days.

(21) Appl. No.: 14/762,441

(22) PCT Filed: Jan. 21, 2014

(86) PCT No.: PCT/GB2014/050161
§ 371 (c)(1),
(2) Date: Jul. 21, 2015

(87) PCT Pub. No.: WO2014/111735
PCT Pub. Date: Jul. 24, 2014

(65) Prior Publication Data
US 2015/0372324 A1     Dec. 24, 2015

(30) Foreign Application Priority Data

Jan. 21, 2013 (GB) .................. 1301037.6
Oct. 3, 2013 (GB) .................. 1317549.2

(51) Int. Cl.
*H01M 8/02* (2016.01)
*H01M 8/0282* (2016.01)
(Continued)

(52) U.S. Cl.
CPC ............ *H01M 8/0282* (2013.01); *C25B 9/08* (2013.01); *H01M 8/0286* (2013.01); *H01M 2008/1293* (2013.01)

(58) Field of Classification Search
CPC .................................................. H01M 8/0282
(Continued)

(56) References Cited

U.S. PATENT DOCUMENTS

2003/0203267 A1    10/2003    Chou et al.
2006/0012135 A1    1/2006    Chou et al.
(Continued)

FOREIGN PATENT DOCUMENTS

CN    102775068 A    11/2012
EP    1566368 A2    8/2005
(Continued)

OTHER PUBLICATIONS

Lessing, Paul A., "A Review of Sealing Technologies Applicable to Solid Oxide Electrolysis Cells", Journal of Materials Science May 2007, vol. 42, Issue 10, pp. 3465-3476 (Abstract).
(Continued)

*Primary Examiner* — Basia Ridley
*Assistant Examiner* — James Erwin
(74) *Attorney, Agent, or Firm* — Kilpatrick Townsend & Stockton LLP (57) ABSTRACT

A gasket for sealing two mating surfaces of a fuel cell is described. The gasket has a core layer comprising exfoliated vermiculite. The core layer is interposed between a first and second coating layer, the said coating layers each comprising glass, glass-ceramic and/or ceramic material. Methods for producing gaskets according to the invention are also described. A solid oxide cell or a solid oxide cell component comprising one or more of the gaskets; use of the gasket to improve sealing properties in a solid oxide cell; and a method of producing a solid oxide cell or of sealing a solid oxide cell comprising incorporating at least one of the gaskets into the solid oxide cell are also defined.

30 Claims, 6 Drawing Sheets

(51) Int. Cl.
*H01M 8/0286* (2016.01)
*C25B 9/08* (2006.01)
*H01M 8/124* (2016.01)

(58) Field of Classification Search
USPC .......................................................... 429/509
See application file for complete search history.

(56) References Cited

U.S. PATENT DOCUMENTS

| | | |
|---|---|---|
| 2007/0111068 A1 | 5/2007 | Gudlavalleti et al. |
| 2007/0259248 A1 | 11/2007 | Chou et al. |
| 2011/0269053 A1 | 11/2011 | DeRose et al. |
| 2012/0107714 A1 | 5/2012 | Day et al. |
| 2013/0177829 A1* | 7/2013 | Homma ............... H01M 8/0282 429/457 |
| 2014/0138921 A1* | 5/2014 | Underwood .......... C04B 35/645 277/627 |

FOREIGN PATENT DOCUMENTS

| | | |
|---|---|---|
| EP | 2648255 A1 | 10/2013 |
| JP | 2006049195 A | 2/2006 |
| JP | 2007273098 A | 10/2007 |
| KR | 20100118444 A | 11/2010 |
| WO | 03092100 A1 | 11/2003 |
| WO | 2005024280 A1 | 3/2005 |
| WO | 2009155184 | 12/2009 |
| WO | 2013061067 A1 | 5/2013 |
| WO | 2013144167 A1 | 10/2013 |

OTHER PUBLICATIONS

Thomann, O., et al., "Development and Application of HVOF Sprayed Spinel Protective Coating for SOFC Interconnects", Journal of Thermal Spray Technology, Jun. 2013, vol. 22, Issue 5 pp. 631-639.
Written Opinion and International Preliminary Report on Patentability in related International Application No. PCT/GB2014/050161, dated Jul. 21, 2015, 6 pages.
International Search Report and Written Opinion in related International Application No. PCT/GB2014/050161, dated May 13, 2014, 8 pages.

* cited by examiner

GASKET FOR FUEL CELLS

CROSS-REFERENCE TO RELATED APPLICATIONS

This application is the U.S. national phase of International Application No. PCT/GB2014/050161 filed on Jan. 21, 2014, and published on Jul. 24, 2014 as International Publication No. WO 2014/111735 A1, which application claims priority to and the benefit of British Application No. 1301037.6, filed on Jan. 21, 2013 and British Application No. 1317549.2, filed on Oct. 3, 2013, the contents of all which are incorporated herein by reference in their entireties.

FIELD OF THE INVENTION

The present invention relates to improved gaskets for use in fuel cells. More specifically, the present invention relates to gaskets having a coated exfoliated vermiculite containing core for use in solid oxide fuel/electrolyzer cells (SOFC and SOEC). The invention also extends to a SOFC and/or SOEC comprising one or more of the improved gaskets.

BACKGROUND OF THE INVENTION

SOFC or SOEC stacks require effective high temperature gaskets to operate efficiently. Such seals must be able to substantially prevent fuel, for example hydrogen, leakage; fuel and oxidant mixing; and oxidant leakage. It is understood that seals should also have similar coefficients of thermal expansion to the surrounding components to avoid stresses. The seals also need to be chemically compatible with the stack components and gases. Furthermore, some seals need to be electrically insulating.

Traditionally, SOFC stack gaskets have been either bonding gaskets (e.g. glass/glass-ceramic or brazes) or non-bonding (compressible) gaskets (For example, see "A review of sealing technologies applicable to solid oxide electrolysis cells" P. Lessing, Journal of Materials Science, 2007, 42 (10), 3465-3476).

The bonding gaskets contain primarily glass and glass-ceramics and they operate by mechanically and chemically bonding to the relevant mating surfaces of the fuel cell. The glass seals are designed to soften and viscously flow above the SOFC operating temperature to provide hermetic sealing. When the SOFC is cooled back down to the operating temperature the glass seals solidify to form a rigid, bonded seal. The drawback of these types of gasket is that they are sensitive to thermo-mechanical stresses, especially in thermal cycling. Changes in thermal expansion coefficients of glasses or glass-ceramics during long term operation can also create additional thermo-mechanical stresses leading to gasket failure.

Non-bonding compressible gaskets are more resistant to thermal cycling as they are not rigidly bonded to adjacent components. However, the leak rates of these types of gaskets are usually higher. The leakage is dominated by interfacial leak paths, especially at low compression stresses. Compressible gaskets also require much higher compressive stresses compared to bonding seals.

More recently, there has been the development of providing multiple material gaskets. The gaskets combine properties from both compressible gaskets and glass-ceramic gaskets. US2003/0203267 A1 discloses a multilayered gasket comprising a mica gasket between outer layers, such as glass or glass-ceramic material.

WO2005/024280 A1 discloses mica seals infiltrated with a glass forming material. WO2009/155184 A1 discloses a double seal having a portion of mica material arranged in proximity to a portion of hermetic sealing material.

Compressive stress is needed in SOFC stacks to ensure adequate sealing performance and to establish good electrical contact between cells and interconnects. The trend in the art is towards larger stacks, meaning a higher compressive force is required and therefore bulkier compression systems. This can lead to higher heat losses and restricted implementation due to design challenges.

Maintaining or improving the sealing properties of the fuel cell gaskets at lower surface stresses is desirable. Lower surface stresses would reduce the size of the compressive systems and result in more degrees of freedom in stack design. For example, thin interconnecting plates would permit more advanced flow geometries and also impart less stress on the relatively fragile cell. This would lead to the creation of more efficient stacks and potential application in more low stress areas.

It is further desirable to provide a gasket that can operate at lower surface stresses whilst maintaining or improving sealing properties over a series of thermal cycles and/or after prolonged use. There is still a further requirement for a gasket to give good properties when a fuel cell has differing pressures between the anode and the cathode. Furthermore, the gasket should provide suitable sealing properties at the desirable operating temperature. It would be advantageous to have the capability of improved sealing even at lower temperatures to reduce long term degradation of the stack.

It is therefore an object of aspects of the present invention to provide a gasket for fuel cells that provides improved properties.

According to a first aspect of the present invention there is provided a gasket for sealing two mating surfaces of a fuel cell comprising a core layer comprising exfoliated vermiculite, said core layer interposed between a first and second coating layer, the said coating layers each comprising glass, glass-ceramic and/or ceramic material.

SUMMARY OF THE INVENTION

Suitably, the coating layers cover at least a part of the surface of the core layer. Generally, the coating layers are contiguous with the core layer so as to cover substantially the entire surface of the core layer. However, the coating layers may overlap the edges of the core layer to merge at their respective peripheries to thereby seal the core layer within the coating layers. Preferably, the coating layers form the outer layers of the gasket such that the coating layers are in contact with the respective mating surfaces, in use, more preferably, the gasket layers are arranged such that substantially none of the core layer contacts the mating surfaces in use. However, it is also possible to have less than 100% coating coverage of the core layer and optionally for some of the core layer to also contact the mating surfaces in use.

Preferably, the gasket of the present invention is for use in a SOFC or SOEC. The gasket is preferably a gasket for use in a SOFC or SOEC to reduce gas leakage.

Advantageously, it has surprisingly been found that gaskets according to the first aspect of the present invention display improved leakage rates, in use. It was also surprisingly found that the improved leakage rates are maintained after thermal cycling, and, moreover, may actually improve after a series of thermal cycles. Low leak rates have furthermore been obtained even with increased pressure overload and over a wide temperature range. Furthermore, advantageously, although enhanced sealing is found at all levels of compressive stress, it has been found that gaskets according the first aspect of the present invention provide particularly improved sealing properties at relatively low compressive stress, typically, less than 0.5 MPa, for example at 0.1 MPa. By operating a SOFC or SOEC at low compressive stress, less bulky compression systems for stack modules can be used allowing for more design freedom and efficiency improvements. Furthermore, with lower surface stresses, thinner interconnect plates can be used rather than etched or machined plates and more advanced flow geometries are possible.

As mentioned above, the core layer of the gasket comprises exfoliated vermiculite. The core layer is intended to be more compressible than the coating at lower temperatures, in particular below the glass transition temperature of the coatings. This allows for the thermo-mechanical stresses to be reduced compared to an all-glass seal. Preferably, the core layer is compressible in the direction perpendicular to its facing surfaces.

Preferably, the exfoliated vermiculite is chemically exfoliated vermiculite (CEV). CEV is formed by treating the ore and swelling it in water. In one possible preparation method, the ore is treated with saturated sodium chloride solution to exchange magnesium ions for sodium ions, and then with n-butyl ammonium chloride to replace sodium ions with n—$C_4$—$H_9NH_3$ ions. On washing with water swelling takes place. The swollen material is then subjected to high shear to produce an aqueous suspension of very fine (diameter below 50 µm) vermiculite particles.

The water may also be removed from the suspension to form dry CEV particles. Preferably, the dry CEV is prepared by a suitable drying technique such as those well known to the skilled man. Suitable drying techniques include cake drying and pulverising; film drying and pulverising; rotary hot air drying; spray drying; freeze drying; pneumatic drying; fluidised bed drying of partially dried solid; and vacuum methods including vacuum shelf drying.

Typically, the core layer of the present invention has a density prior to use of 1.7-2.0 g/cm$^3$, more typically, around 1.9 g/cm$^3$.

Preferably, CEV provides up to 100% w/w of the total exfoliated vermiculite in the core layer, typically, 80-100% w/w, more typically, 90-100%, generally approx 100% CEV w/w total exfoliated vermiculite in the core layer. The core layer may also include dry derived CEV i.e. CEV added to the core composition in a dry state prior to formation and drying of the core gasket composition. However, generally the source of CEV is an aqueous dispersion thereof prepared directly from the vermiculite ore.

Preferably, the proportion of CEV is at least 30% w/w of the core layer, more preferably at least 35% w/w of the core layer.

Typically, the level of CEV falls within the range 30-70% w/w of the core layer, more typically, 35-65% w/w of the core layer, most typically 40-55% w/w of the core layer.

Preferably, the core layer is in the form of a foil of exfoliated vermiculite formed by calendering a wet dough composition or by drying after spreading a wet dough composition with a doctor blade.

The core layer may include further components besides exfoliated vermiculite. For example, the core layer may further comprise a suitable filler. A preferred filler is talc. An example talc filler is Magsil Diamond D200 available from Richard Baker Harrison Limited.

Preferably, the proportion of filler is at least 40% w/w of the core layer, most preferably, at least 45% w/w of the core layer. Typically, the level of filler falls within the range 70-30% w/w of the core layer; more typically 65-35% w/w of the core layer, most typically 60-48% w/w of the core layer. Preferably the filler has a mean particle size ($d_{50}$)of approximately 20 pm as determined by a Malvern Sizer 3601. By "approximately" is meant ±10%.

Typically, the exfoliated vermiculite core layer is in the range of 10-2000 µm thickness, more typically 50-1000 µm, most typically 300-800 µm.

As mentioned above, the gasket further comprises coating layers. The coating layers of the present invention are designed to hermetically seal the mating surfaces of the SOFC or SOEC and bond to the core layer of the gasket. The coating layers are further operable to accommodate surface imperfections in the mating surfaces thus acting to substantially seal direct leak paths. Furthermore, when one or more of the coating layers are arranged directly adjacent to the core layer, the coating layer(s) may act to accommodate surface imperfections in the core layer material, thus also substantially sealing direct leak paths in the core layer. Accordingly, the core layer and coating layers are preferably bonded together. As such, preferably the coating layers are arranged in the gasket such as to be in contact with the core layer, preferably, by direct coating of the core layer to form an immediate first and second coat on opposed facing surfaces of the core layer. The coating layers of the invention are particularly advantageous due to surface imperfections and striations being typical on the surface of the core layer of the present invention.

Preferably, the coating layers are of an amorphous, crystalline or semi-crystalline character. In general, the coating layers may comprise any degree of amorphous or crystalline character depending upon the application and may be of any composition in the continuum between a material of a completely crystalline or amorphous nature. Furthermore, the coating may be altered to higher proportions of crystalline content over time by, for example, exposure to elevated temperatures. Preferably, the coating layers comprise glass or a mixture of glass and ceramic material. The materials are selected so that the coating is sufficiently deformable at the chosen operating temperature and compressive stress. Where the coating material includes crystalline character this may be in the range 5-70% w/w, more typically, 10-60%, most typically, 20-50% w/w at operating temperatures using XRD and the Rietveld Method.

Advantageously, it has been found that glass or glass-ceramic material coating layers can be tailored to allow for filling of cracks or surface imperfections in the core layer during use.

Usually, the glass or glass-ceramic material contains amounts of Si, Al, Mg, Na, Ca, Ba and/or B in their various oxidised forms. It will be understood by the skilled man that the exact composition of the coating layers will depend upon the operating conditions of the fuel cell, such as the operating temperature. Preferably, the coating layers comprise one or more suitable glass or glass-ceramic materials suitable for use in coatings for fuel cell applications.

Various commercially available glass/glass-ceramic materials that are suitable for use in the present invention are available, for example, Schott GM 31107, Kerafol™ Kera-Glas ST K01 or HCStarck HCS3. Each of these may be used as a coating on a suitable exfoliated vermiculite core gasket material such as Thermiculite 866, available from Flexitallic.

The coatings of the present invention are adapted to be conformable to the exfoliated vermiculite core layer in such a manner that the coating fills the imperfections in the core layer surface and thereby seals leak paths. Generally, this takes place during operating temperatures.

The type of coating material may be varied according to the desired operating temperature of the stack. For example, where a fuel stack has a particular operating temperature, the coating materials may be selected so that the viscosity of the materials are tailored to the stack operating temperature so that the coating conforms to the adjacent surfaces at those temperatures. It is preferable that the glass/glass-ceramic materials have a wetting-flowing temperature in the region of or above the operating temperature of the fuel cell in which the seal is to be used. For example, where a fuel cell stack has an operating temperature of 700° C. a coating material having a wetting-flowing temperature range of around 700 to 800° C. may be used. Accordingly, the preferred required sealing temperature of the coating material is above the softening temperature, more typically, between the softening and hemisphere temperatures of the coating as the hemisphere temperature is generally indicative of the onset of the wetting phase. Fuel cell operating temperatures vary depending on the nature of the stack and may be between 500° C. and 1000° C. but are generally between 650° C. and 1100° C. and generally the coating material should still provide an effective seal at the lowest operating temperature. Accordingly, the preferred softening temperature range of the coating material is between 450 and 1000° C., more preferably, 500-950° C. to meet the requirements of various fuel cells. The hemisphere temperature range may be 10-500° C. higher than the ranges for the softening temperature, more preferably, 10-200° C. As fuel cell operating temperatures for a given fuel cell may vary in use, the coating material should preferably be operable over However, it is preferred in some embodiments in the present invention for the hemisphere temperature to be below the upper operating temperature of the fuel cell so that the wetting phase or even the flowing phase may be reached during initial cycling as this will assist sealing between the core and coating layers. The flowing temperature of the coating material may be 5-100° C. above the hemisphere temperature ranges. Typical flowing temperature ranges are 800-1500° C. but for glass-ceramic composites in the range 750-1100, more preferably, 800-1050° C. It will be appreciated that the pressure on the stack will also affect the sealing, hemisphere and flowing temperature. However, the temperature ranges above may be determined by a hot stage microscope at atmospheric pressure.

Preferably, each coating layer has a thickness of between 0.1 and 50 μm, more typically, 0.5 and 25 μm, 1 to 15 μm.

Although multiple coats of coatings composition may be applied, preferably only one coat of coating composition is applied for each coating layer in the gasket.

Typical densities of the glass or glass-ceramic coatings are in the range 2-4 g/cm$^3$.

Weight per unit area (mg/cm$^2$) of the coatings will depend on the nature of the coatings and the thickness of the coatings applied to the gasket but is typically in the range 0.2 to 8 mg/cm$^2$ after organic burnoff.

Suitably, the coating layers may initially have a viscosity of 1 to 10$^4$ Pa·s when the temperature in the stack is at the operating temperature. However, over time, the amorphous phases may increasingly crystallise leading to increases in viscosity at operating temperature.

Advantageously, a low viscosity of the coating layers permits good wetting of adjacent surfaces as well as penetration to the exfoliated vermiculite pores.

The mating surfaces of the SOFC or SOEC may be formed of the same or different materials. Preferably, the mating surfaces are formed of metal or ceramic. Most preferably, the mating surfaces are formed of steel such as high temperature ferritic steel. A suitable stainless steel is Crofer 22 APU which forms a chromium—manganese oxide layer which is very stable up to 900° C.

Advantageously, the superior performance of gaskets according to the invention allows the use of lower surface stresses whilst still achieving gas sealing. Accordingly, use of the invention also allows the use of parts for the fuel cell with lower stress limits. Such parts include thin interconnect plates which can be conveniently produced by pressing rather than etching or machining, for example. This allows for greater design freedom and more advanced flow geometries in the fuel cell. Typically, the thin metal plates of the fuel cells of the invention are in the range 0.1 to 1.5 mm thickness, more preferably, 0.1 to 1 mm thickness, most preferably, 0.1 to 0.5 mm thickness.

In one preferred embodiment of the present invention the exfoliated vermiculite is 80%-100% w/w CEV and the proportion of CEV is at least 30% w/w of the core layer.

In other preferred embodiments of the present invention the exfoliated vermiculite is 80-100% w/w CEV; the proportion of CEV is at least 30% w/w of the core layer; the proportion of filler is at least 40% w/w of the core layer; the coatings layers are preferably in contact with the core layer; and the coating layer optionally has a thickness of between 0.1 and 50 μm; and optionally the gasket has an uncompressed thickness in the range 10-2100 μm.

According to a second aspect of the present invention there is provided a method for producing a gasket according to the first aspect of the present invention comprising the steps of;
  a. coating a glass or glass-ceramic layer onto each of the opposed surfaces of an exfoliated vermiculite gasket core layer;
  b. locating the coated gasket in a fuel cell between mating surfaces to be sealed;
  c. optionally, heating the gasket to remove any remaining volatile organic components;
  d. optionally, heating the gasket to effect sintering of the coating layers;
  e. optionally, further heating to effect wetting of the coating layers.

The method may include the step of forming, preferably cutting, the exfoliated vermiculite core layer into the required gasket shape prior to or after coating step a. Preferably, the forming, more preferably, cutting step takes place prior to step a. In this manner recycling of any unused parts of the core layer is more easily effected as separation from the coating layer is then avoided.

The coating layers may be applied to the core layer in any manner known to the skilled man. Preferably, the coating is applied in the form of a liquid suspension or paste-type formulation. For example, the coating layers may be applied by spraying, brushing, spatula, roller, draw bars, tape or screen printing. The method of application will dictate to a certain extent the content of the coating formulation. Accordingly, the coating formulation typically includes a binder component. The binder component will usually be one or more of an organic and/or polymeric binder(s). A mixture of binders may be required to suit the application. Furthermore, the coating formulation typically includes a liquid carrier component. The liquid carrier component may be a solvent for the binder or the mixture of binders. There may be more than one carrier in the liquid carrier component, for example, the liquid carrier component could be made up of a mixture of one or more solvent carriers and/or one or more liquid non-solvating carriers.

In general, the coating layer may be applied as a brush-type coating or a spray-type coating formulation. When the coating layer is applied by spraying, the coating layer formulation will comprise one or more suitable binders (typically, organic binders), glass or glass-ceramic powder and usually a high level of liquid carrier. For reasons of delivery, the spray-type coating formulations require higher levels of liquid carrier than the brush-type coating formulations. As such, when the coating layer is applied with a brush-type formulation, the formulation will generally comprise one or more suitable binders (typically, organic binders), glass or glass-ceramic powder and a reduced level of liquid carrier. The brush-type coating formulations are generally suitable for all the non-spray application methods. Typically, a brush-type coating formulation may have 30-90% by wt glass or glass-ceramic material in the formulation, more typically 40-80% by wt, most typically 50-75% by wt.

Accordingly, in this case, the binder component and liquid carrier component substantially provide the balance of the coating formulation. In a spray-type formulation, the glass, glass-ceramic or ceramic component may provide 10-70 wt %, more typically, 20-60 wt %, most typically, 30-50 wt % of the composition with the balance again substantially made up of the organic binder component and liquid carrier component.

In use, the liquid carrier component generally evaporates during drying and the binder component in the coating layer and any remaining liquid carrier component is removed due to the heating up of the fuel cell prior to use. Accordingly, after production and initial drying the gasket includes binder component, whereas in use, the binder component is substantially removed. Preferably, the liquid carrier component comprises solvent for one or more of the components in the coating formulation or may simply act as a carrier in which components are dispersed.

Usually, the liquid carrier component will include solvent and/or non-solvating carrier. Preferably, the solvent is able to substantially dissolve the one or more binders. Suitable solvents may be selected organic solvents and/or water. Suitable organic solvents may be selected from the list including terpineols (including the known isomers thereof α-, β-, γ-, and 4-terpineol); ketones such as diethyl ketone, methyl butyl ketone, dipropyl ketone and cyclohexanone; alcohols such as ethanol, n-pentanol, 4-methyl-2-pentanol, cyclohexanol and diacetone alcohol; ether based alcohols such as ethylene glycol monomethyl ether, ethylene glycol monoethyl ether, ethylene glycol monobutyl ether, propylene glycol monomethyl ether and propylene glycol monoethyl ether; unsaturated aliphatic alkyl monocarboxylates such as n-butyl acetate and amyl acetate; lactates such as ethyl lactate and n-butyl lactate; ether-based esters such as methyl cellosolve acetate, ethyl cellosolve acetate, propylene glycol monomethyl ether acetate and ethyl-3-ethoxypropionate. They may be used alone or in combination of two or more. A preferred non-solvating liquid carrier is water. A preferred solvent carrier mixture is ethanol and terpineol.

Preferably, the organic binder component is present in the range 1-60% of the substantially dried coating layer, more typically 10-50% w/w dried coating layer, most typically, 10-30% w/w dried coating layer. Accordingly, the glass, glass-ceramic or ceramic component is generally present in the range 40-99% w/w dried coating, more typically, 50-90% w/w, most typically 50-90% w/w. However, in practice some residual liquid carrier may also be present in the dried coating. After heat treatment to burn off any residual liquid and binder component, particularly any organic binder, the coating layers preferably comprise greater than 80 wt % glass or glass-ceramic, more preferably greater than 90 wt %, most preferably greater than 95 wt %, especially greater than 99 wt %.

When the binder is a polymeric binder in the coating carrier composition it may be selected from any which substantially burn off prior to stack operation. Binders which leave a minimal carbon deposit are preferred. Examples may be selected from one or more of cellulose binders such as ethyl cellulose; acrylate homo or copolymers; polyvinyl butyral; and/or rosin. Suitable acrylic homo or copolymers are known to the skilled person for example, those defined in EP 1566368A2, paragraphs [0024] to [0028].

The coating formulations may additionally comprise further additives known to the skilled person, for instance, in a water based coating, such as a latex, emulsifier may be required.

It will be clear to the skilled man that the contents and the proportions of the coating formulation may be altered according to the desired properties of the formulation, such as thickness, adherence etc.

The coating formulation may be formed by any method known to the skilled man. Usually, the coating formulation can be prepared by mixing the organic binder component, any liquid carriers and glass or glass and ceramic powders.

The coated core layer may be dried in a conventional oven. The length and temperature of the drying step will depend, for example, upon the content of the coating formulation and the thickness of the coating layer. In general, it is preferable to dry the coating layers at a temperature below the boiling point of the liquid carrier in order to avoid bubble formation in the coating layers and ensure complete drying. For example, when ethanol is used in the liquid carrier component, the coating layers may be dried at around 70° C. until the desired amount of liquid carrier has been removed. In one embodiment, a proportion of liquid carrier component is left in the coating layers after drying. Advantageously, the coating layers in this form can serve as a low temperature adhesive, and as such serve to improve the ease of handling the assembled components prior to first use.

The gasket may be cut into the required shape before coating, but is typically cut into the required shape after coating and initial drying by any suitable method known to the skilled man.

Preferably, the coating layers are bonded to the core layer before stack assembly and heat-up.

The conditions of the heat treatment steps (c) to (e) in the second aspect of the invention will depend upon the coating composition used. The heat treatment is preferably optimised such that the coating layers accommodate any imperfections in the surface of the core layer Preferably, the heat treatment process is carried out using either a step-wise, continuous or mixed step-wise and continuous temperature gradient. For example, the temperature may be increased at a relatively steady rate of between 20 to 100 K/h, more preferably between 50 to 70 K/h, most preferably between 55 to 65 K/h. Typically, the rate of temperature increase will allow for the evaporation and burn out of the organic binder component to be completed before the glass begins to sinter. The temperature at which sintering and wetting occurs will depend upon the coating composition used. Preferably, the heat treatment is conducted in an atmosphere of air. Typically, organic binder component burn off takes place below 500° C.

Optionally, the heat treatment is carried out in a step-wise manner, meaning the temperature is raised and substantially held at a specific raised level for a period of time before being further raised and substantially held, and so on until heating is complete. As such, in one embodiment, the heating may involve removing any remaining liquid carrier component at a relatively low temperature. The temperature may then be raised to a higher temperature and maintained at this temperature to allow for a controlled burnout of any organic carriers. A controlled burnout is favoured in order to help prevent carbon formation. The temperature may then be raised to a further higher temperature at which point wetting and sintering of the coating occurs.

Advantageously, steps (d) and (e) of the heat treatment allow the coating layer to fill the core's surface imperfections. Furthermore, the coating substantially seals direct leak paths. In one embodiment, the coating layers may be operable to seal cracks in the core that form during thermal cycling.

According to another aspect of the present invention there is provided a method for producing a gasket according to the first aspect of the present invention comprising the steps of;
 a. coating a glass or glass-ceramic layer onto each of the mating surfaces to be sealed;
 b. locating an exfoliated vermiculite gasket core layer between the coated mating surfaces to be sealed;
 c. mating the coated surfaces and interposed gasket core layer together;
 d. optionally, heating the gasket to remove any remaining volatile organic components;
 e. optionally, heating the gasket to effect sintering of the coating layers;
 f. optionally, further heating to effect wetting of the coating layers.

The coating layers of this aspect of the present invention may be in accordance with, prepared and applied to the mating surfaces according to any of the compositions and methods described in relation to the coating layers of the first or second aspect of the present invention. Preferably, the coating layers are applied to the mating surfaces in the form of a paste. Preferably, the method of applying the glass or glass-ceramic coating layers to the mating surfaces is by extrusion such as beading by extrusion.

Steps (d) to (f) may be carried out as described according to steps (c) to (e) of the second aspect of the present invention and the optional features thereof as described above.

The method may include the step of forming, preferably cutting, the exfoliated vermiculite gasket core layer into the required gasket shape prior to locating it between the coated mating surfaces to be sealed.

Advantageously, the method according to this aspect permits even greater material efficiency in the production of gaskets according to the present invention. The shape of the gasket is generally dictated by the shape of the mating surfaces, however, the core layer material is commonly produced in large sheets. As such, shaping of the glass coated core layer sheets may result in cut-offs which can go to waste. Accordingly, by applying the glass or glass-ceramic coating layer initially to the mating surfaces, wastage of the coating composition is avoided. Furthermore, in this manner recycling of the unused parts of the core layer is more easily effected.

A gasket according to the aspects of the present invention comprises an exfoliated vermiculite core layer interposed between coating layers. Preferably, the coating layers of the gasket are arranged substantially immediately adjacent to the core layer and, typically, in bonded contact therewith. Thus, the coating layers are preferably in continuous contact with the core layer so that no further layer is interposed therebetween.

Typically, the coated gasket has an uncompressed thickness in the range 10-2100 µm, more typically 50 to 1050 µm, most typically 300 to 830 µm.

Usually, the coating layers will be reasonably fluid and conformable at the operating temperature of the stack. However, at lower temperatures the coating layers can solidify, for example during thermal cycling. As such, the thermal expansion coefficients (CTE) of the coating layers, the core layer and the mating surfaces may be substantially the same. Typically, the mating surfaces of the cell have a CTE in the range $10\text{-}13.10^{-6}K^{-1}$ during operating temperatures. Matching of the CTE of the coating material and the mating surfaces is particularly advantageous at these temperatures but also more particularly below the operating temperature and therefore below the Tg of the coating material to avoid damage to the seal during thermal cycling. Suitably, the coating material has a CTE relative to the mating surfaces of $+/-2.10^{-6}K^{-1}$, more preferably, $+/-1.5.10^{-6}K^{-1}$ between 600-1000° C.

According to another aspect of the present invention there is provided a solid oxide cell or a solid oxide cell component comprising one or more gaskets according to any of the aspects of the present invention.

Preferably, the solid oxide cell is a solid oxide fuel cell(SOFC) or a solid oxide electrolyzer cell(SOEC).

Preferably, the solid oxide cell comprises at least one gasket according to the first aspect of the invention. Optionally, the solid oxide cell may comprise gaskets between one or more of the cell electrolyte and cathode; the electrolyte and anode; the cathode and anode; the cell and an interconnect, an interconnect and an interconnect; an interconnect and an endplate; a cell and an endplate; and/or a cell and a cell.

According to another aspect of the present invention there is provided use of a gasket according to any of the aspects of the present invention to improve sealing properties in a solid oxide cell, particularly a SOFC or SOEC.

According to another aspect of the present invention there is provided a method of producing a solid oxide cell or of sealing a solid oxide cell comprising incorporating at least one gasket according to any of the aspects of the present invention into the solid oxide cell.

The term 'solid oxide cell" herein includes a solid oxide fuel cell or a solid oxide electrolyzer cell.

For a better understanding of the invention, and to show how embodiments of the same may be carried into effect, reference will now be made, by way of example, to the following experimental data and figures.

Hemisphere temperature is the temperature at which the height of the sample is half of the diameter so it is an index of the approach of wetting.

The Hemisphere (or Half Sphere) temperature is reached when the height of the sample is half the width of the base.

DETAILED DESCRIPTION OF THE INVENTION

EXAMPLES

In the following examples, embodiments of the invention described herein were prepared and tested as described below.

Examples 1 to 6 are gaskets according to the present invention. All the materials of these examples were prepared for an average stack operating temperature of 700° C.

Example 1

The coating carrier composition contained 80 wt % α-terpineol (from Merck), 15 wt % ethanol and 5 wt % ethyl cellulose (from Fisher Scientific) and glass powder (GM31107, available from Schott), with a glass to organic ratio of 2:1 w/w. The glass has a Tg of 532° C. and a softening temperature of 649° C. The exfoliated vermiculite core layer was (Thermiculite 866, available from Flexitallic). The Thermiculite was consolidated to a density of 1.9 g/cm$^3$ before use in order to smooth the outer surfaces and therefore minimise the amount of leak channels formed between the core layer and the mating surfaces which normally arise due to the natural relative roughness of exfoliated vermiculite.

The Ethyl cellulose was mixed with terpineol and ethanol at 35° C. with a magnetic stirrer for 24 h. After that the glass powder was added and the mixture was stirred for 1 h.

The coating carrier composition was applied to the core layer by brush. Application by this method allowed for a thicker consistency and good coverage was easily achieved with a single layer.

After application of the coating, the sheets were dried at 80° C. for 2 h and then cut to the required shape. Leak tests were conducted using ring-shaped seals having 40 mm outer diameter and 5 mm width. The gaskets were placed on top of a 20 mm Crofer 22 H steel available from ThyssenKrupp VDM GmbH mating plate and a 1 mm Crofer 22 H steel mating plate was placed on top of the gasket. Heat up procedure occurred as follows:
1. Heat up from room temperature to 700° C. at 60K/hr
2. Test run at 700° C.
3. Cool down to ambient temperature 1 K/min.

The sample achieved sufficiently low viscosity and surface tension of the glass to achieve good wetting of adjacent surfaces and penetration to the vermiculite pores.

Figure 1:
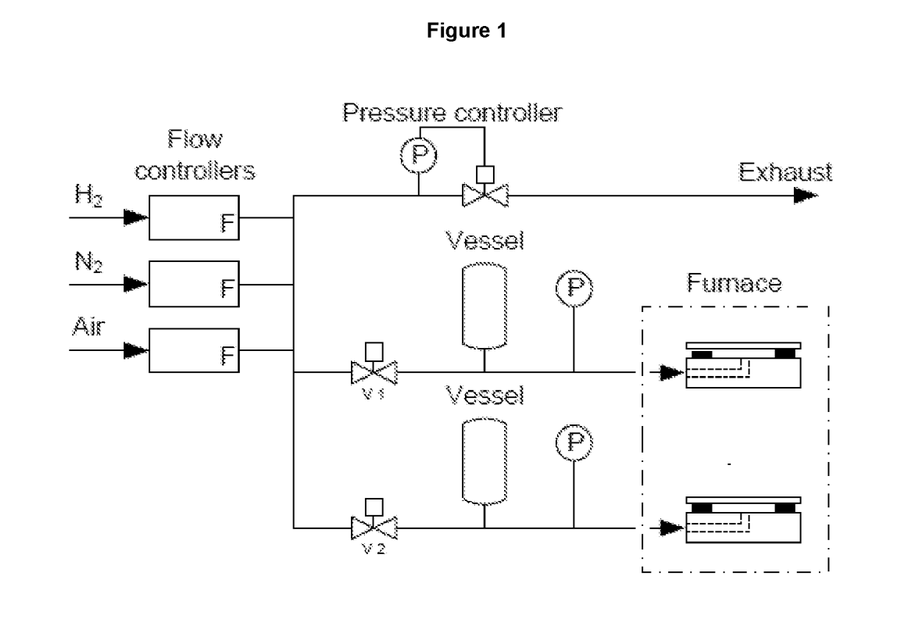
FIG. 1 shows a schematic drawing of the testing apparatus according to example 1

To test the sample, gas was fed through the thick bottom plate. FIG. 1 presents the experimental setup for leak rate measurements. Samples were exposed to a 25 mbar overpressure using 50/50 mix of H2/N2 at 700° C. Periodical leak rate measurements were conducted by shutting off the valves (V1, V2) and measuring the pressure decay.

Example 2

The coating composition contained 44 wt % α-terpineol, 53 wt % ethanol, 3 wt % ethyl cellulose and glass (GM31107, available from Schott), with a glass to organic ratio of 1:2 w/w. The exfoliated vermiculite core layer (Thermiculite 866) was prepared in the same manner as example 1. The coating carrier composition was also prepared using the method given for example 1 except the additional ethanol solvent was added and stirred into the mixture at the end.

On this occasion, a wet spraying application was used to coat the core layer. The carrier had been thinned with ethanol to achieve suitable viscosity for the spray gun (U-POL Maximum HVLP mini with 1.0 mm nozzle). Several layers were sprayed from a distance of 10 to 20 cm. The viscosity of the resulting spraying suspension was 3.5 to 4.0× 10$^{-2}$Pa·s.

Heat-up and testing was conducted as for example 1.

Figure 2:
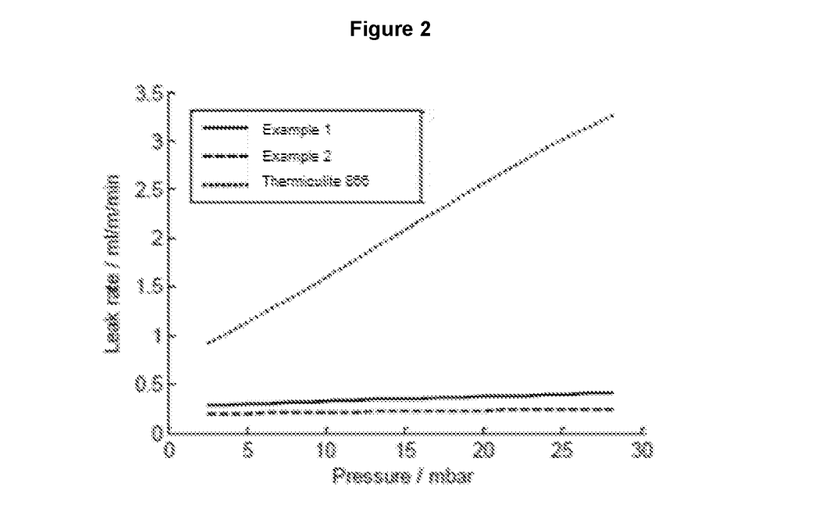
FIG. 2 shows pressure versus leak rates for embodiments of the invention

FIG. 2 presents the leak rates of examples 1, 2 and an uncoated Thermiculite 866 comparative example as a function of pressure at 0.1 MPa compressive stress.

Figure 3:
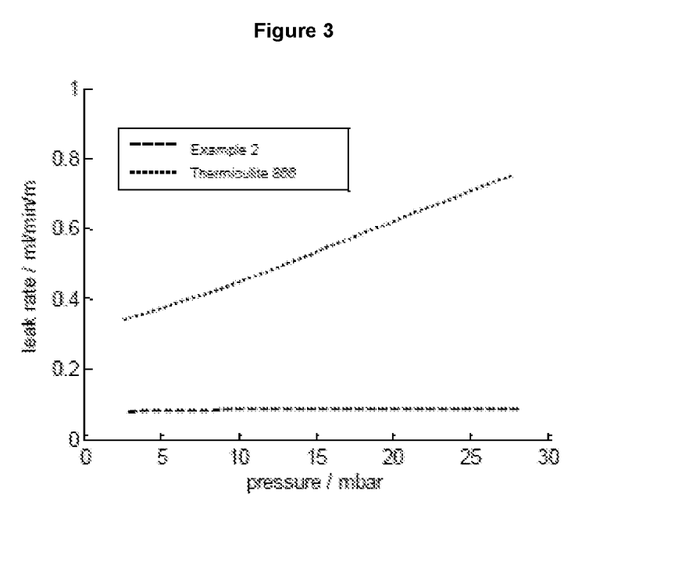
FIG. 3 shows pressure versus leak rates for embodiments of the invention

FIG. 3 presents the leak rates of example 2 and the uncoated Thermiculite as a function of pressure at 0.4 MPa compressive stress.

The results of examples 1 and 2 show that the gaskets of the present invention provide substantially better leakage rates than a comparative Thermiculite only seal, especially at low compression stress levels. The gaskets according to the present invention show leaks rates of 0.1 to 0.03 ml(m min)$^{-1}$, which is a reduction of 60 to 90% compared to uncoated samples.

Furthermore, the leak rate is shown to be almost independent of overpressure indicating that the primary leak mechanism is diffusion rather than advection. This was further tested by measuring leak rates with different gas compositions.

Figure 4:
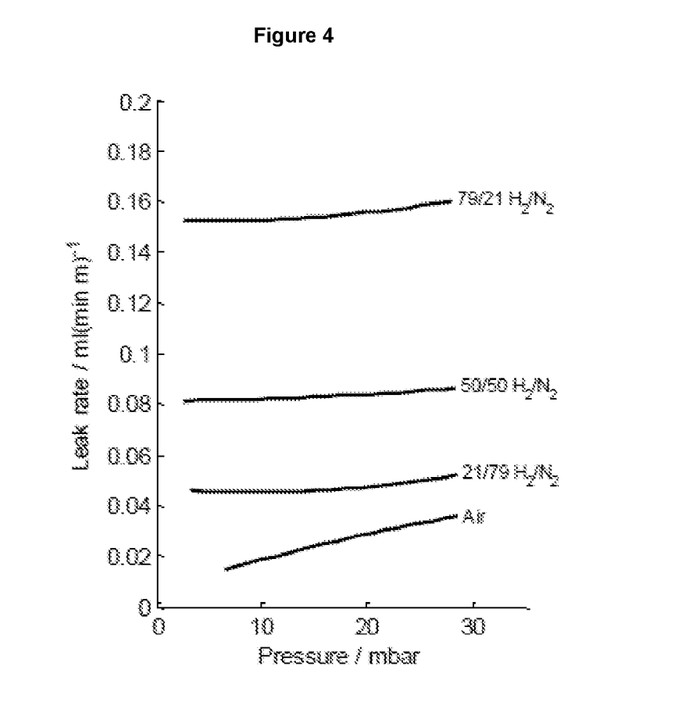
FIG. 4 shows pressure versus leak rates for embodiments of the invention
Figure 5:
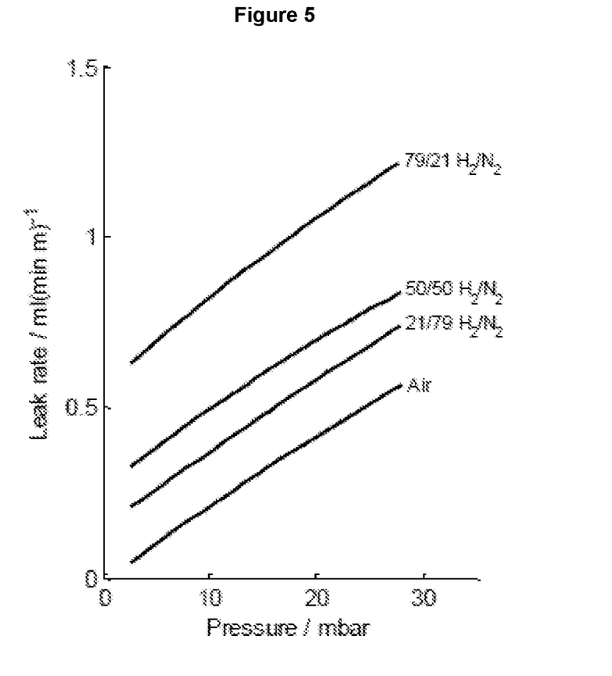
FIG. 5 shows pressure versus leak rates for a comparative example

FIG. 4 presents the leak rates of the coated gasket according to example 2 at different gas compositions and FIG. 5 also presents the leak rates of an uncoated Thermiculite gasket of the type used for example 2 with different gas compositions.

Extrapolating the curves measured with air, one obtains more or less zero leak rate at zero pressure difference. However, with other gas compositions than air, there is clearly a diffusion component present. As such, leak rates can vary depending upon the gas combinations used.

Figure 6:
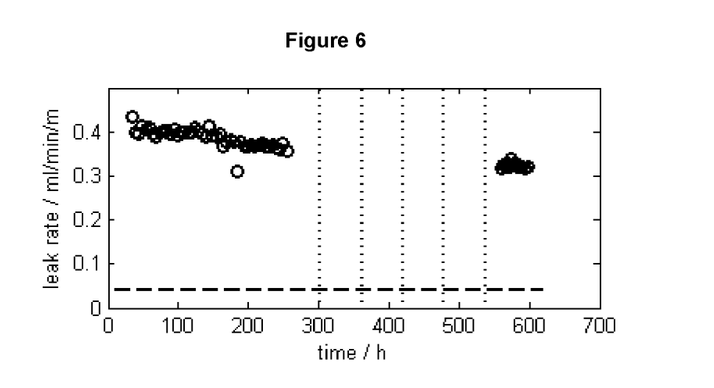
FIG. 6 shows leak rate versus time for an embodiment of the invention
Figure 7:
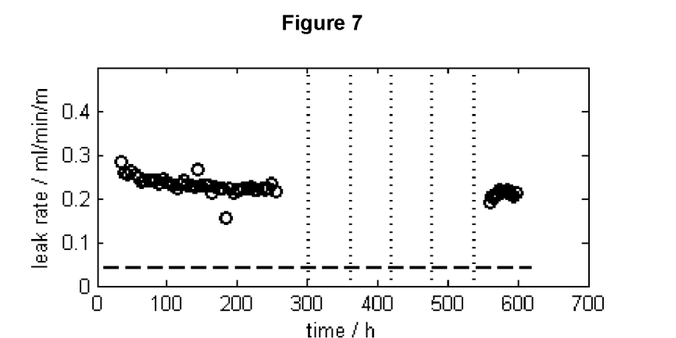
FIG. 7 shows leak rate versus time for an embodiment of the invention
Figure 8:
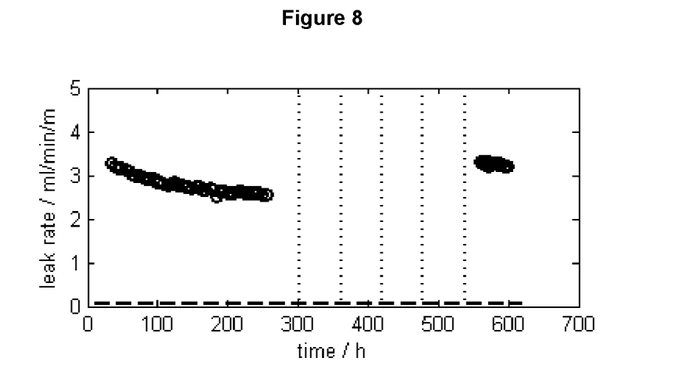
FIG. 8 shows leak rate versus time for a comparative example

FIGS. 6, 7 and 8 present the leak rates of gaskets over time and show the effects of thermal cycling on leak rates. The figures are related to gaskets according to example 1, 2 and the comparative example respectively. The compressive stress used in these test runs was 0.1 MPa and the thermal cycling period was between 300 and 530 hours. FIGS. 6 and 7 show how the low leak rates of gaskets according to the present invention are maintained or even improved following a period of thermal cycling. In comparison, the uncoated Thermiculate gasket has a higher initial leak rate that worsens after thermal cycling.

Examples 3 and 4

To further test the sealing properties of the coated seals with different temperatures and gas overpressures two coated seals were manufactured. The coating slurry formulation was manufactured by mixing the organic components a-terpineol, Elvacite 2045 and ethanol in a proportion of 80/11/9. Glass powder (Schott GM31107) was then added to the organic slurry with constant stirring using a magnetic stirrer. Doctor blade casting was used to apply the coating formulations to 0.7 mm thick consolidated Thermiculite 866 core layers (available from Flexitallic). The following samples were formed:

Example 3. A coated seal with 5/10 w/w organic components to glass ratio

Example 4. A coated seal with 5/13 w/w organic components to glass ratio

After drying at ambient temperature for 72 h, the samples were cut into 40 mm OD, 30 mm ID sealing rings. The rings were assembled between two Crofer 22 APU plates available from ThyssenKrupp VDM GmbH and 0.870 mm thick spacers were inserted in the middle of the rings to correspond to the fuel cell in a stack. The test apparatus was assembled according to FIG. 1 and measurements were taken according to the methodology of example 1. Gas was fed inside the sealing ring through a hole in the middle of the bottom plate. A weight corresponding to 0.4 MPa of compressive stress was applied on top of the seals.

Figure 9:
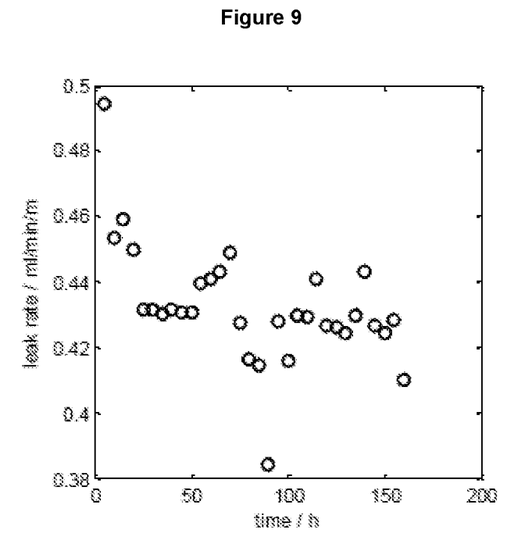
FIG. 9 shows leak rate versus time for an embodiment of the invention
Figure 10:
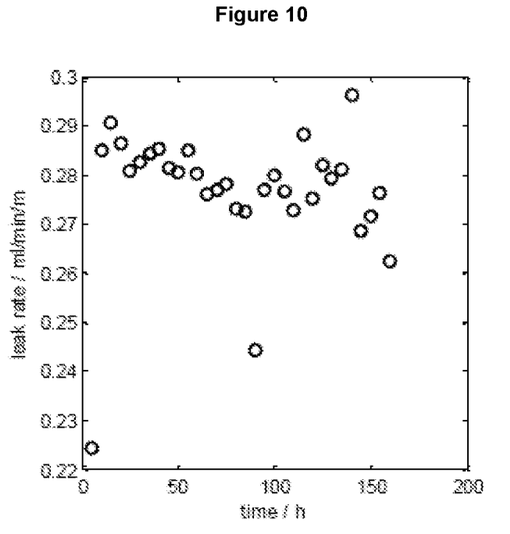
FIG. 10 shows leak rate versus time for an embodiment to the invention

The samples were heated up to 700° C. at a rate of 60 K/h with air at 2.5 mbar overpressure. After heat up, the gas mixture was changed to 50/50 $H_2/N_2$ and the overpressure was elevated to 25 mbar. FIGS. 9 and 10 show the leak rates of examples 3 and 4 respectively. It can be noticed that the leak levels remain at the very low level of ~0.5 ml/m/min at 20 mbar overpressure. In addition, the leak rate is almost independent of the temperature or pressure and unaffected by the thermal cycle. Further leak rate measurements were taken for examples 3 and 4 after prolonged use. After 1300 hours the leak rates for the examples were approximately 0.49 ml/min/m and 0.32 ml/min/m respectively. As such, the leak rates at the end of the test were substantially the same as the leak rates at the start of the test, showing excellent long term leak rates.

Example 5

SEM Analysis

A SEM analysis of a gasket according to the present invention was undertaken. The seal was prepared by placing a sample of the gasket according to example 1 and 2 between two 1 mm Crofer 22 H sheets. The sample underwent heat treatment, as described above, but with a 50 h dwell at 700° C. Thin glass layers around 2 to 10 μm are formed at the interfaces of the vermiculite and Crofer 22 H plates. The glass accommodated the surface roughness of the vermiculite and penetrated into its pores. This behaviour indicates self-healing of cracks that could develop in the vermiculite core or in the glass layer due to thermo-mechanical stresses.

Example 6

Stack Test

To verify the suitability of the invention in a SOFC stack environment, a simple one cell stack was constructed. The stack consisted of anode and cathode endplates (20 mm Crofer 22 APU) into which gas channels were machined. A chromium barrier coating of $MnCo_{1.8}Fe_{0.2}O_4$ was coated on the cathode endplate by a high velocity oxygen flame method (as described in Development and Application of HVOF Sprayed Spinel Protective Coating for SOFC Interconnects, O. Thomann, M. Pihlatie, M. Rautanen, O. Himanen, J. Lagerbom, M. Makinen, T. Varis, T. Suhonen, and J. Kiviaho, Journal of Thermal Spray Technology, 2013). The cell used in this test was Elcogen ASC-10B having an active area of 80 $cm^2$. The stack had two seals: a seal between cell electrolyte and cathode end plate and a second seal between the end plates. The seals were formed according to the procedure of example 2. The compressive force on the stack was 120 kg corresponding to about 0.3 MPa on the gaskets.

The stack was heated up according to the heat-up method given in example 1. After reaching 700° C. operating temperature, the anode was reduced using $H_2$ in $N_2$. Gas flows were then set to 2.011 NLPM air and 0.843 NLPM $H_2$. With these nominal flows cathode inlet pressure was 10 mbar and anode inlet pressure 1 mbar. With 100% $H_2$ at the anode the open circuit voltage was 1225 mV, indicating a water vapour content of less than 0.3% at the anode compartment. This means that the total oxygen leak from cathode and ambient to anode was around 1 $ml_N$/min. Thermal cycles were conducted by reducing the temperature of the stack to 150° C. and then increasing it back to operating temperature at a rate of 120 K/h. After 1000 h dwell, the open circuit was measured again showing a value of 1230 mV indicating that the oxygen leak to anode had not increased.

Figure 11:
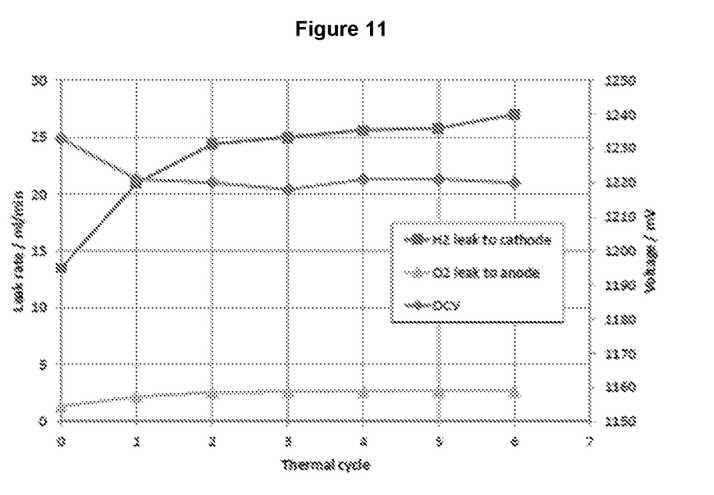
FIG. 11 shows leak rate and voltage during thermal cycles

FIG. 11 presents the results of six thermal cycles. $H_2$ leak to cathode remained steady after three thermal cycles and the OCV remained at a high level between thermal cycles, indicating a very low $H_2O$ concentration at the anode (<3%). This shows a low cathode to anode leak at ambient temperature.

Figure 12:
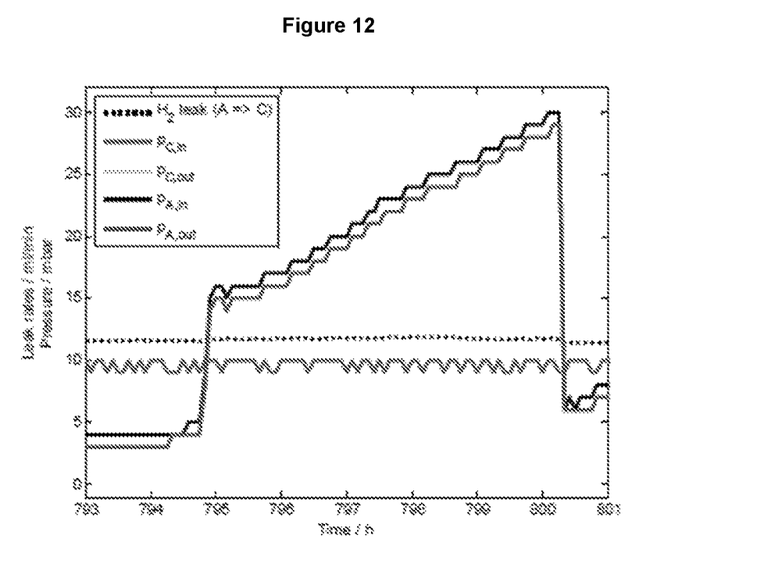
FIG. 12 shows variable pressure difference and the effect on anode to cathode leak rates over time

FIG. 12 presents the anode to cathode $H_2$ leak versus pressure results. The anode pressure was increased and this can be seen by the increased pressure plots for the anode inlet and outlet. The cathode pressure was not increased. The cathode inlet pressure is shown as generally constant. The pressure at the cathode outlet was measured at zero throughout testing (not shown in FIG. 12) due to the presence of a large diameter outlet pipe. The rate of hydrogen leak during the test remained substantially constant, which shows that leak rates are independent of pressure difference between anode and cathode.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A gasket for sealing two mating surfaces of a fuel cell comprising a core layer comprising exfoliated vermiculite and first and second coating layers said core layer interposed between the said first and second coating layers, the said coating layers each comprising glass, glass-ceramic and/or ceramic material.

2. The gasket of claim 1, wherein the core layer has a density prior to use of 1.7-2.0 g/cm$^3$.

3. The gasket of claim 1, wherein the coating layers each have a glass transition temperature, and wherein the core layer is more compressible than the coating layers when the gasket is at a temperature below the glass transition temperatures of the coating layers.

4. The gasket of claim 1, wherein the core layer is compressible in the direction perpendicular to its facing surfaces.

5. The gasket of claim 1, wherein the exfoliated vermiculite is chemically exfoliated vermiculite (CEV).

6. The gasket of claim 5, wherein the proportion of CEV is at least 30% w/w of the core layer.

7. The gasket of claim 1, wherein the exfoliated vermiculite core layer is in the range of 10-2000 μm thickness.

8. The gasket of claim 1, wherein the coating layers are of an amorphous, crystalline or semi-crystalline character.

9. The gasket of claim 1, wherein the glass, glass-ceramic and/or ceramic material has a softening temperature in the range between 450 and 1000° C.

10. The gasket of claim 1, wherein each coating layer has a thickness of between 0.1 and 50 μm.

11. The gasket of claim 1, wherein the densities of the glass or glass-ceramic coatings are in the range 2-4 g/cm$^3$.

12. A method for producing a gasket, comprising;
  a. applying a glass or glass-ceramic coating layer onto each of two opposed surfaces of an exfoliated vermiculite gasket core layer to form a coated gasket;
  b. locating the coated gasket in a fuel cell between mating surfaces to be sealed.

13. A method for producing a gasket, comprising;
  a. applying a glass or glass-ceramic coating layer onto each of two mating surfaces to be sealed to form coated mating surfaces;
  b. locating an exfoliated vermiculite gasket core layer between the coated mating surfaces;
  c. mating the coated surfaces and interposed gasket core layer together to form the gasket between the mating surfaces.

14. The method of claim 12, wherein the glass or glass-ceramic coating layer is applied in the form of a liquid suspension or paste-type formulation.

15. The method of claim 14, wherein the liquid suspension or paste-type formulation comprises an organic binder component, a glass or glass-ceramic powder, and a liquid carrier component.

16. The method of claim 15, wherein the liquid carrier component comprises a solvent and/or non-solvating liquid carrier.

17. The method of claim 16, wherein the solvent comprises an organic solvent selected from one or a combination of terpineols; ketones; alcohols; ether based alcohols unsaturated aliphatic alkyl monocarboxylates; lactates; and ether based ester.

18. The method of claim 17, wherein the terpineols comprise α-, β-, γ-, and/or 4-terpineol.

19. The method of claim 16 wherein the solvent comprises water.

20. The method of claim 16, wherein the non-solvating liquid carrier is water.

21. The method of claim 15, further comprising drying the liquid suspension or paste-type formulation, wherein after drying, the organic binder component comprises 1-60% w/w of the dried glass or glass-ceramic coating layer.

22. A solid oxide cell or a solid oxide cell component comprising a gasket of claim 1.

23. The method of claim 12, further comprising heating the gasket.

24. The method of claim 23, wherein the heating removes volatile components.

25. The method of claim 23, wherein the heating effects sintering of the coating layers.

26. The method of claim 23, wherein the heating effects wetting of the coating layers.

27. The method of claim 13, further comprising heating the gasket.

28. The method of claim 27, wherein the heating removes volatile components.

29. The method of claim 27, wherein the heating effects sintering of the coating layers.

30. The method of claim 27, wherein the heating effects wetting of the coating layers.

* * * * *

UNITED STATES PATENT AND TRADEMARK OFFICE
CERTIFICATE OF CORRECTION

PATENT NO. : 9,793,556 B2
APPLICATION NO. : 14/762441
DATED : October 17, 2017
INVENTOR(S) : Markus Rautanen et al.

Page 1 of 1

It is certified that error appears in the above-identified patent and that said Letters Patent is hereby corrected as shown below:

In the Specification

Column 4, Line 5:
Delete "pm"
Insert --µm--

Signed and Sealed this
Twenty-fifth Day of August, 2020

Andrei Iancu
*Director of the United States Patent and Trademark Office*